Dec. 21, 1965  J. N. SCOTT, JR  3,225,127
BLOW MOLDING FOAM BOTTLES
Original Filed Sept. 16, 1960

INVENTOR.
J. N. SCOTT, JR.
BY
*Younger Grigg*
ATTORNEYS

3,225,127
BLOW MOLDING FOAM BOTTLES
John N. Scott, Jr., Bartlesville, Okla., assignor to Phillips Petroleum Company, a corporation of Delaware
Original application Sept. 16, 1960, Ser. No. 56,337. Divided and this application May 20, 1963, Ser. No. 281,581
11 Claims. (Cl. 264—54)

This application is a divisional of Serial No. 56,337, filed September 16, 1960.

This invention relates broadly to improvements in the process for manufacturing blown thermoplastic resin hollow articles, for example bottles, that are light weight and have good insulating properties.

It is known to blow bottles and other hollow articles from organic plastic materials, commonly known as "plastics," by extruding the material in plastic form through an annular extrusion nozzle to form a parison of the plastic material, and after the parison has been closed, to blow the parison to conform with the contour of a surrounding mold cavity. Such a method is employed for the manufacture of bottles and other hollow articles from the thermoplastic material known as polyethylene. The present invention relates to an improved process for blow molding such articles and to novel and improved articles produced from said process.

Another object of this invention is to provide an improved process for preparing blow molded hollow thermoplastic articles.

A further object of this invention is to provide method for making novel plastic or polymer blow molded hollow articles of higher bulk to weight ratio than presently available.

Another object of this invention is to provide method for making a light-weight, blow molded hollow article having good insulating properties formed from a foamed thermoplastic resin.

Other objects, aspects as well as the several advantages will become apparent to those skilled in the art from a study of the accompanying disclosure and the appended claims.

In accordance with the present invention, in the production of blow molded hollow articles wherein a parison of plastic material is formed and a fluid medium is employed to expand the parison to conform to the contour of the blow mold, the present invention relates to the improvement comprising incorporating a foaming agent into the plastic material prior to the extrusion of the parison. In actual operation, as the parison is extruded, it is foamed due to the expansion of foaming agent and, after blowing, a light-weight hollow article is formed.

More specifically, the present invention relates to an improved process for producing a foamed plastic hollow article which comprises forming a mixture of a normally solid plastic and a foaming agent of the group consisting of inert gases, volatile liquids, and finely divided solids which decomposes to gaseous products at extrusion temperatures, extruding said mixture through an orifice to form a parison whereby said parison is foamed due to release of said agent, and then blow molding said foamed parison within a blow mold to form said foamed article as a product of the process. The resulting foamed article has a substantially increased bulk to weight ratio, thereby forming a light-weight, substantially non-flexible walled hollow article with good insulating properties.

To more clearly understand my invention, reference is made to the accompanying self-explanatory drawings in which the apparatus for producing the foamed hollow articles and a finished article are shown.

Figure 1:
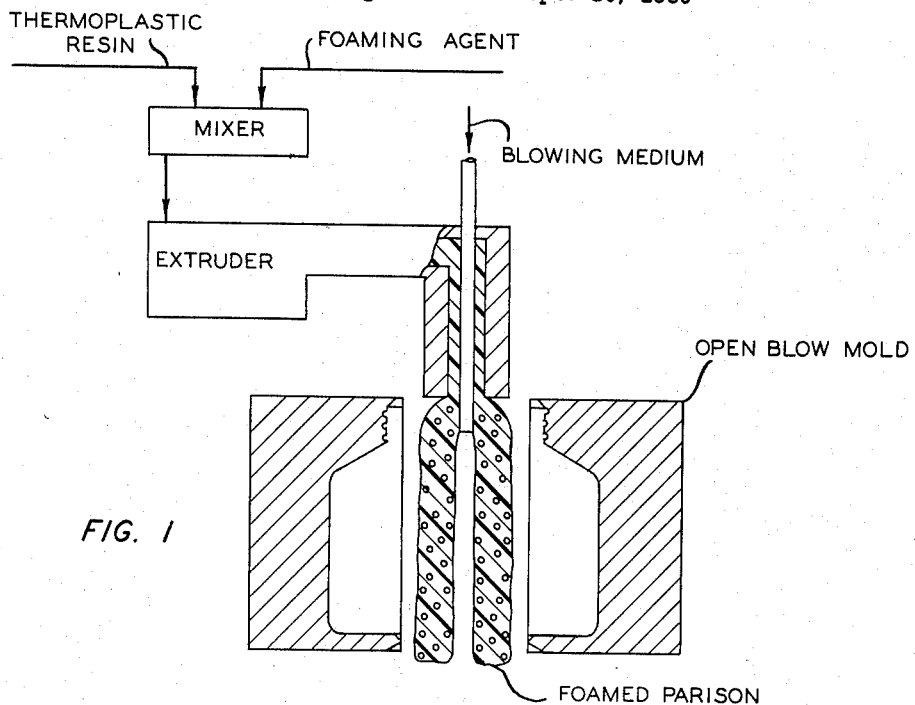
FIGURE 1 is a partial cross-sectional view showing a blow mold about to close on a foamed parison according to this invention.
Figure 2:
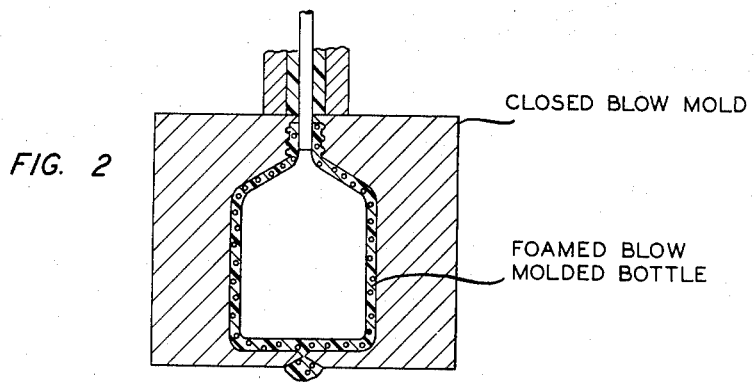
FIGURE 2 is a partial cross-sectional view showing the blow mold closed and the foamed blow-molded article after the parison has been inflated with the blowing agent in accordance with the invention.
Figure 3:
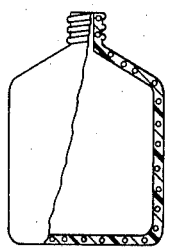
FIGURE 3 is a partial cross-sectional view of a foamed blow-molded bottle according to this invention.

The process of the present invention is applicable to substantially all of the normally solid polymers, resins, and plastics, including thermosetting resins, polystyrene, polyolefins, especially polyethylene. In general, any solid polymer of an aliphatic mono-1-olefin can be used within the scope of this invention. Examples of such starting materials include polymers and copolymers of aliphatic mono-1-olefins such as ethylene, propylene, butene-1, hexene-1, octene-1 and the like. Polymers of aliphatic mono-1-olefins having a maximum of 8 carbon atoms per molecule and no branching nearer the double bond than the 4-position provide foamed products having particularly desirable properties. Homopolymers and copolymers, as well as mixtures of homopolymers and copolymers are suitable polymeric materials for the foamed articles of the invention.

A preferred embodiment of the invention is directed to the use of polymeric materials prepared from ethylene which in an unfoamed state have a density of at least 0.940 gram/cc. (ASTM-D-1505-57T), and preferably 0.960, or higher. It has been found that the foamed products of these polymers possess exceptional properties as compared to other polymers. While this type of ethylene polymer constitutes a preferred embodiment of the invention, conventional high pressure polyolefins, especially polyethylenes, of lower density as well as other polymers of aliphatic mono-1-olefins and other plastics and resins are within the scope of the invention and can be blow molded into the desired hollow articles having a foamed wall.

The polyolefins, especially polyethylenes, that can be employed in the practice of the present invention can be prepared by any of the methods which are usually employed for the preparation of these polymers. The high density polyolefins prepared by the low pressure processes now known are particularly useful in the preparation of the hollow articles of the invention. However, the invention is also applicable to the lower density polyolefins as well.

In addition to the low pressure methods of preparing the preferred polyolefins, the invention also includes within its scope the use of polyethylenes, for example, prepared by the conventional high pressure methods and other methods which are well known in the art. For example, suitable polymeric starting materials can be prepared in the presence of organo-metallic compounds, such as triethylaluminum plus titanium tetrachloride, mixtures of ethylaluminum halides with titanium tetrachloride, and the like. Another group of catalysts which can be used comprises a halide of a Group IV metal of the Periodic Table of Elements (Mendeléeff) such as, for example, titanium tetrachloride, silicon tetrabromide, zirconium tetrachloride, tin tetrabromide, etc. with one or more free metals selected from the group consisting of sodium, potassium, lithium, rubidium, zinc, cadmium and aluminum.

Various gaseous, liquid, and solid foaming agents are effective in the process of the invention. In general these agents comprise materials which are gaseous at temperatures of the molten plastic or polymer at the extrusion die. Solid materials which decompose at these temperatures and yield gaseous products or components which react with other ingredients present in the melt to produce gaseous products are applicable. Any inert gas which is non-deleterious to the polymer or plastic being extruded can be used. Such gases include nitrogen, steam, $CO_2$, low boiling hydrocarbons (for example, propane, butane and pentane), and Freon. Liquids that can be employed include water, ammonia, and hydrocarbons which vaporize at the extrusion temperatures as the extrudate enters a lower pressure zone. Solid chemical blowing or foaming agents that can be used include p,p'-oxybis(benzene sulfonyl hydrazide) and azodicarbonamide which are sold under the trade names of Celogen and Celogen AZ, respectively, by Naugatuck Chemical, a division of the United States Rubber Company, diazoaminobenzene, dinitrosopentamethylenetetraamine, 4-nitrobenzenesulfonic acid hydrazide, beta-naphthalene sulfonic acid hydrazide, diphenyl-4,4'-di(sulfonylazide) and mixtures of materials such as sodium bicarbonate with a solid acid such as tartaric acid.

The amount of foaming agent to be used in the process will vary appreciably depending upon the foaming agent polymer, extrusion conditions, etc., but generally will be in the range of about 0.01 to about 25 weight percent of the polymer or plastic being extruded. Solid foaming agents are preferred and generally will be used in the range from 0.01 to about 5 weight percent, preferably 0.1 to 1.0 weight percent, based on the polymer or plastic being extruded.

As the first step of the preparation of the foamed products of the present invention, a foaming agent of the type previously described is incorporated into a polymeric starting material, for example, an unfoamed ethylene polymer. This step of the process can be carried out at a temperature either above or below the softening point of the polymer and is effected by any suitable method, such as by mixing on a roll mill, in a Banbury mixer, in a dry blender, or the like. The temperature during mixing of the agent and polymer is maintained below the decomposition temperature of the foaming agent to avoid foaming. Mixing of the materials is continued until a homogenous mixture is obtained. Following mixing, the mixture can be pulverized, if desired.

After the polymer and foaming agent have been thoroughly mixed in the dry state to form a homogenous mixture, the mixture obtained is then passed to an extruder wherein the mixture is thoroughly worked and heated before passage through the extrusion die. The temperature employed at the extrusion die varies with the type of plastic or polymer being extruded, it being essential that the molten plastic be at a temperature which facilitates sufficient extrusion. The extrusion temperatures of various plastics and polymers are well known in the art. Generally, extrusion temperatures employed will range from about 250 to about 600° F., usually from about 350 to about 550° F. Extrusion pressure employed will vary with the type of plastic or polymer and the foaming agent incorporated therein and will generally range from about atmospheric to as high as 2,000–4,000 p.s.i.g., preferably 500–1500.

The molten plastic or polymer containing the foaming agent is then extruded through an annular orifice to form a foamed parison due to the expansion of the foaming agent which is volatile at extrusion temperatures and readily expands within the parison as it issues from the extrusion die into a zone of lower pressure. The foamed parison is then placed in a blow mold cavity and expanded within the blow mold by introducing a fluid medium, such as air, into the parison. After blowing the parison to conform to the contour of the blow mold, the blow molded product is removed as a light-weight item, having relatively non-flexible walls with good insulating properties.

As will be understood by those skilled in the art, the polymers, especially the ethylene polymers and copolymers employed in the invention can be modified by the addition of conventional ingredients such as pigments, dyes, fillers, lubricants, etc. prior to the foaming operation.

As will be seen from the foregoing discussion, the present invention provides an improved process for the production of blown thermoplastic resin hollow articles such as bottles and the like that are light-weight and have excellent insulating properties. Considerable effort has been devoted in the industry to the development of insulated containers for both hot and cold products, but most of these items consist of expensive double-wall containers. However, in accordance with the present invention, a single walled, light-weight hollow article having relatively non-flexible walls with good insulating properties can be obtained, thereby providing an inexpensive plastic article having very desirable properties.

The following example is given to better illustrate the invention. However, this example is to be construed as illustrating the invention and not necessarily limiting the same.

Example I

A high density polyethylene prepared in cyclohexane in the presence of a chromium oxide catalyst according to the method of Hogan et al., supra, was formed into pellets. The polyethylene had a density of 0.960 gram/cc. (ASTM-D-1505-57T) and a melt index of 5 (ASTM-D-1238-52T).

The polyethylene pellets were mill blended with 0.25 weight percent of the powdered foaming agent azodicarbonamide (Celogen AZ). The mixing temperature was controlled between 300 and 340° F. The decomposition temperature of Celogen AZ is about 375° F. The mixing of polyethylene and blowing agent was continued until a homogenous mixture was obtained. Upon completion of the mixing of the polymer and the blowing agent, the mixture was taken from the mill and then introduced into an extruder wherein the mixture was worked and heated to a temperature of about 380–400° F.

The molten polyethylene containing Celogen AZ was extruded into the atmosphere through an annular orifice to form a foamed parison (tube) due to expansion of the foaming agent which is volatile at the extrusion temperatures and readily expands the parison outside of the extrusion die. The foamed parison was then placed in a blow mold wherein it was inflated with air and formed into a foamed polyethylene bottle having a bulk density of 32 lbs./ft.$^3$.

In accordance with the process of the invention, high density polyethylene can be formed and blow molded to produce hollow articles having a density as low as 2–5 lbs. per cubic foot as compared to about 64 lbs. per cubic foot for the raw polyethylene. The density of the foamed hollow articles can vary from about 2 to 64 lbs. per cubic foot and preferably from about 5 to 35 lbs. per cubic foot. The density of the product articles can be advantageously controlled by regulating the type and amount of the foaming agent in the extrudate.

Having thus described the invention by providing specific examples thereof, it is to be understood that no undue limitations or restrictions are to be implied by reason thereof, but that the scope of the invention is defined by the appended claims.

I claim:

1. In a process for the production of blow molded hollow plastic articles wherein a parison of said plastic is formed and then said parison is expanded within a mold to conform to the contour of said mold by a fluid medium, the improvement comprising incorporating a foaming agent into said plastic prior to formation of said parison so that said parison is foamed before being molded, thereby forming a foamed plastic article as a product of the process.

2. In a process for the production of blow molded hollow polyolefin articles wherein a parison is extruded around a mandrel and then said parison is expanded within a mold by a fluid medium, the improvement comprising incorporating a foaming agent into said polyolefin prior to extrusion of the parison so that said parison is foamed before being molded, and then blow molding said foamed parison, thus forming said foamed polyolefin hollow articles as a product of the process.

3. The process according to claim 2 wherein said polyolefin is polyethylene and said agent is present in the range 0.01 to about 25 weight percent based on said polyolefin.

4. A process for producing a foamed plastic hollow article which comprises forming a mixture of a normally solid plastic and a foaming agent of the group consisting of inert gases, volatile liquids, and finely divided solids which decomposes to gaseous products at extrusion temperatures, extending said mixture through an orifice to form a parison, said parison being formed due to expansion of said agent, and blow molding said foamed parison within a blow mold to form said foamed article as a product of the process.

5. The process of claim 4 wherein the amount of said foaming agent is within the range of 0.01 to about 25 weight percent of said plastic.

6. The process of claim 5 wherein said plastic comprises a polymer of at least one aliphatic mono-1-olefin having a maximum of 8 carbon atoms per molecule and no branching nearer the double bond than the 4-position.

7. The process of claim 4 wherein said plastic comprises essentially polyethylene having a density in the range of 0.940 to 0.980.

8. The process of claim 7 wherein said foaming agent comprises p,p'-oxybis(benzene sulfonyl hydrazide).

9. A process for forming a hollow article of foamed polymer of ethylene employing a blow mold which comprises extruding a molten mixture of said polymer and a foaming agent which is gaseous at a temperature in the range of 300 to 600° F. through an orifice at said temperature to form a foamed parison, and then blow molding said foamed parison within said mold to form said foamed article as a product of the process.

10. The process of claim 9 wherein said polymer is polyethylene having a density in the range of 0.940 to 0.980.

11. The process of claim 10 wherein said foaming agent is azodicarbonamide and is present in the range of 0.1 to 1.0 weight percent of said polymer.

References Cited by the Examiner

UNITED STATES PATENTS

| | | | |
|---|---|---|---|
| 2,724,860 | 11/1955 | Strong | 18—55 XR |
| 2,917,217 | 12/1959 | Sisson | 18—48 |
| 3,144,493 | 8/1964 | Santelli | 264—51 |

ROBERT F. WHITE, *Primary Examiner.*

MORRIS LIEBMAN, ALEXANDER H. BRODMERKEL, *Examiners.*

Notice of Adverse Decision in Interference

In Interference No. 96,602 involving Patent No. 3,225,127, J. N. Scott, Jr., BLOW MOLDING FOAM BOTTLES, final judgment adverse to the patentee was rendered Mar. 29, 1971, as to claims 1-8.

[*Official Gazette April 18, 1972.*]